United States Patent [19]

Gabor et al.

[11] Patent Number: 4,505,720

[45] Date of Patent: Mar. 19, 1985

[54] GRANULAR SILICON CARBIDE ABRASIVE GRAIN COATED WITH REFRACTORY MATERIAL, METHOD OF MAKING THE SAME AND ARTICLES MADE THEREWITH

[75] Inventors: Thomas Gabor, Maplewood; David E. Broberg, Woodbury; Gunther H. Dierssen, White Bear Lake; Donley D. Rowenhorst, North St. Paul, all of Minn.

[73] Assignee: Minnesota Mining and Manufacturing Company, St. Paul, Minn.

[21] Appl. No.: 508,852

[22] Filed: Jun. 29, 1983

[51] Int. Cl.³ .............................................. B24D 11/00
[52] U.S. Cl. ...................................... 51/295; 51/308; 51/309; 427/217; 427/250
[58] Field of Search ........................ 51/295, 309, 308; 264/81, 82; 427/217, 219, 250

[56] References Cited

U.S. PATENT DOCUMENTS

| | | | |
|---|---|---|---|
| 2,628,896 | 2/1953 | Erasmus et al. | 51/298 |
| 2,750,268 | 6/1956 | Erasmus et al. | 51/307 |
| 3,269,815 | 8/1966 | Koopman | 51/308 |
| 3,508,890 | 4/1970 | Fontanella | 51/295 |
| 3,520,667 | 7/1970 | Taylor | 51/295 |
| 4,115,959 | 9/1978 | McCormick | 51/309 |
| 4,249,913 | 2/1981 | Johnson et al. | 51/295 |
| 4,286,905 | 9/1981 | Samanta | 51/309 |
| 4,336,304 | 6/1982 | Landingham et al. | 428/336 |
| 4,340,568 | 7/1982 | Hirsi et al. | 422/245 |
| 4,416,912 | 11/1983 | Bache | 427/250 |
| 4,424,066 | 1/1984 | Sarin et al. | 51/309 |

FOREIGN PATENT DOCUMENTS 4950008  9/1972  Japan .
7145086  2/1981  Japan .
7145087  2/1981  Japan .
7145088  2/1981  Japan .
7145089  2/1981  Japan .

OTHER PUBLICATIONS

"An Abrasive Material Based on Silicon Nitride for Grinding Unhardened Steels", I. I. Osipova et al., Institute of Materials Science, Academy of Sciences, Ukrainian SSR. No. 5, (1973), pp. 34-37, May, 1977, (Trans.-Poroshkovaya Metalurgiya).
"Possibility of Silicon Nitride as Abrasive Grain", pp. 155-156, Bulletin, Japan Soc. of Prec. Engg., vol. 13, No. 3, (Sep. 1979).
Preparation and Properties of Solid State Materials, W. R. Wilcox, ed., vol. 7, Chapter 2, Marcel Dekker Inc., New York, (1982) D. R. Messier et al., "Silicon Nitride".

Primary Examiner—Paul Lieberman
Assistant Examiner—W. Thompson
Attorney, Agent, or Firm—Donald M. Sell; James A. Smith; Richard Francis

[57] ABSTRACT

Improved granular abrasive material comprises silicon carbide particles at least partially coated with an integral, durable surface layer of a hard refractory material comprising metal nitride or carbide. Hard refractory materials which provide a useful coating include, for example, silicon nitride or carbide, titanium nitride or carbide, sialon, and others. The surface layer is preferably provided by chemical vapor deposition, most preferably utilizing a fluidized bed. The improved granular abrasive material is particularly useful in various abrasive products such as coated abrasive products, nonwoven abrasive products and abrasive grinding wheels.

27 Claims, 4 Drawing Figures

GRANULAR SILICON CARBIDE ABRASIVE GRAIN COATED WITH REFRACTORY MATERIAL, METHOD OF MAKING THE SAME AND ARTICLES MADE THEREWITH

TECHNICAL FIELD

The present invention relates to improved granular abrasive material made by providing silicon carbide particles with a coating of hard refractory material at least over a portion of their surfaces and abrasive articles including the same.

BACKGROUND ART

Of the granular materials which are utilized as abrasive particles or abrasive grain, silicon carbide is relatively inexpensive and useful but the workpieces which may be efficiently abraded by it are rather limited. Silicon carbide is commonly used to abrade cast iron, various metals and non-metallic materials. Silicon carbide is not very useful for abrading steel, largely because of its chemical reactivity with steel at the high interface temperatures generated during grinding. Various attempts to improve the steel abrading performance of silicon carbide have been made, but these have not provided significant improvement in the performance of the modified abrasive grains.

The use of various refractory materials such as silicon nitride as an abrasive material per se has its advocates and detractors, leading one skilled in the art to be unsure whether an abrasive grain made wholly or partly of silicon nitride could ever be useful for grinding steel and various other workpieces. Erasmus et al. (U.S. Pat. Nos. 2,750,268 and 2,628,896) observe that silicon nitride abrasive powders or compacts provide an excellent abrasive for abrading hard substances such as cast iron, cobalt-chromium-tungsten alloys, synthetic sapphire crystals, brass, aluminum, and others. More recently, an article entitled "An Abrasive Material Based on Silicon Nitride For Grinding Unhardened Steels" by I. I. Osipova et at., Institute of Materials Science, Academy of Sciences of the Ukrainian SSR. translated from Poroshkovaya Metalurgiya, No. 5 (1973) pp. 34-37, May, 1977 suggests that silicon nitride may be used as an abrasive material because it has a relatively high microhardness, stable physical properties and crystal structure, is easy to produce and has a fine-grain homogeneous structure. However, still more recently, Samanta (U.S. Pat. No. 4,286,905) notes that silicon nitride-based ceramic cutting tools exhibit poor resistance to wear or surface abrasion and oxidation when used to machine steel or nodular iron at elevated temperatures, e.g. 1000°-1200° C. This reference indicates that tools made of this material wear out readily as evidenced by severe crater wear. Samanta suggests that such poor wear resistance is an inherent defect in the silicon nitride.

Matsuno et al., in an article entitled "Possibility of Silicon Nitride as Abrasive Grain", pages 155-156, Bulletin Japan Soc. of Prec. Engg., Vol. 13, No. 3 (September 1979) acknowledge that silicon nitride may be employed as an abrasive material. Matsuno et al. report on the testing of chemical vapor deposited and pressed silicon nitride abrasive grits and conclude that the grinding capacity of silicon nitride does not exceed that of conventional abrasive grain and that it would be "unnatural to hope much from this new ceramic material as an abrasive grain."

Modified abrasive particles, some of which include a coating of silicon nitride, have been prepared. In most cases, however, such coatings served to protect the abrasive grit from attack by molten metals during formulation into abrasive articles or to provide a surface with improved adhesion. Reference which disclose coating to improve adhesion include, for example, Japanese Pat. No. 49-50008 (diamond coated with silicon nitride) and U.S. Pat. No. 3,520,667 (diamond coated with silicon carbide). Similarly, Johnson et al. (U.S. Pat. No. 4,249,913) disclose coating silicon carbide particles with alumina to prevent dissolution or diffusion of the silicon carbide in a molten metal matrix. By contrast, the present applicant has discovered that such a combination (alumina coated on silicon carbide particles) does not provide an improved abrasive material unless the silicon carbide particle has been first coated with a metal nitride and then overcoated with alumina.

Koopman (U.S. Pat. No. 3,269,815) discloses cementing finely divided particles of solid materials such as carbides and nitrides (such as silicon nitride) to silicon carbide or aluminum oxide abrasive grains by a thin film of glass. Applicant has discovered, however, that silicon carbide particles coated with glass-cemented particles of silicon nitride, as described in Koopman, provides abrasive grain which has grinding performance on steel virtually the same as uncoated, untreated silicon carbide abrasive grain, when such abrasive grain is incorporated and tested in abrasive discs.

Despite the fact that the vapor deposition of refractory materials on various substrates is well known, as exemplified by Hirai et al. (U.S. Pat. No. 4,340,568), disclosing the chemical vapor deposition of silicon nitride, and Landingham et al (U.S. Pat. No. 4,336,304), disclosing the chemical vapor deposition of sialon, applicant is unaware of any reference which teaches chemical vapor deposition of refractory coatings comprising metal nitride or carbide on silicon carbide abrasive granules. Examples of chemical vapor deposition of silicon nitride are also disclosed by D. R. Messier et al., "Silicon Nitride" in *Preparation and Properties of Solid State Materials,* W. R. Wilcox, ed., Volume 7, Chapter 2, Marcel Dekker Inc., New York (1982).

Examples of chemical vapor deposition of other refractory materials on cutting tools are given in Japanese Pat. Nos. 57,145,086, 57,145,087, 57,145,088, and 57,145,089, published Sept. 2, 1982.

DISCLOSURE OF THE INVENTION

The granular abrasive material according to the present invention comprises silicon carbide, each particle thereof characterized by being at least partially covered with an integral, durable, adherent, preferably non-fused coating consisting essentially of hard refractory material comprising metal nitride or carbide. At least a part of the coating is comprised of a metal nitride refractory material such as silicon, titanium, aluminum nitride or oxynitride, etc., or a metal carbide refractory material such as silicon carbide, titanium carbide, etc.

The term "refractory material" is used herein to describe ceramic materials which are heat resistant up to temperatures of about 1650° C. The term "metal" refers to any metal which combines with nitrogen to form a nitride or oxynitride or carbon to form a carbide to provide a hard refractory material. The term "nitride" is intended to include oxynitride. While silicon and boron are not normally classified as metals, they have certain properties which make them metal-like and therefore they are intended to be included herein within the definition of metal. The term "integral" is intended to denote that the refractory coating is complete in itself, whether partially or completely coating the particle. By contrast, Koopman, supra, discloses applying a layer of a glass to the surface of a particle to bind refractory particles thereon and, while the glass layer may be integral, the refractory particles are not. The term "durable" is intended to denote that the coating remains on the surface of the silicon carbide particle during use to a sufficient extent to significantly improve abrasive performance. The term "adherent" is intended to denote that the coating is substantially firmly bonded to the surface of each silicon carbide particle. The term "non-fused" is intended to denote that the coating has been applied without melting the coating materials. The foregoing terms are not intended to denote that the coating is free of cracks, pores or other imperfections. In use, contacted portions of the coated particle typically wear away, removing both the coating and a portion of the core, but leaving a coating on the remaining portion of the particle.

To provide an integral, durable, adherent, preferably non-fused coating of refractory material on silicon carbide particles, there preferably should be a reasonably close match of the thermal expansion of the coating and the silicon carbide substrate over a relatively wide temperature range to limit failure caused by differential expansion and contraction. Such a temperature range would include formation temperatures typically about 1400°–1500° C. and storage temperatures as low as −40° C. It is, however, possible to mitigate stresses induced by thermal expansion or contraction by employing intermediate layers or graded multicomponent compositions having appropriate thermal expansion or contraction properties. Such constructions may also be used to improve adhesion, mechanical properties, and heat transfer characteristics. A limited mismatch in thermal expansion coefficients may be advantageous if, on cooling from the deposition temperature, the coating provides stress distributions which actually inhibit crack propagation.

Preferred refractory coatings comprise compositions of silicon nitride or titanium nitride and multicomponent compositions comprising these and other refractory materials such as alumina. Silicon nitride-aluminum nitride composition is a preferred multicomponent coating. At present, the most preferred coating consists essentially of silicon nitride.

It is also possible to coat the silicon carbide particles with multiple coatings of different hard refractory materials. One may also deposit multicomponent coatings which may be a single phase or multiphase. In both cases they may be of constant composition or graded.

A graded multicomponent system is one where the ratio of components changes through the layer. A graded multicomponent system may be provided, for example, by the portion of a coating, at the surface of the particle, being formed of one monocomponent refractory material with gradually increasing concentrations of another component perpendicular to the interface until, at the surface of the coated particle, the coating consists essentially of the multicomponent system or a monocomponent composition of the other refractory material. Other variations of graded mixtures will also be apparent to those skilled in the art.

The coating may include other components such as graphite which are not necessarily hard refractory materials.

The granular abrasive material of the present invention may be incorporated into various articles of the type which normally includes granular abrasive material to provide abrasive articles with improved properties. For example, the granular abrasive material of the present invention may be included as part or all of the granular abrasive material in coated abrasive products, nonwoven abrasive products, and bonded abrasives such as grinding wheels. The granular abrasive material of the invention may provide all of the abrasive in the abrasive article or it may be utilized with other abrasive or nonabrasive materials to reduce costs, to provide additional properties or for other purposes.

The granular abrasive material of the present invention has significantly increased abrasive performance, particularly when utilized as the abrasive material in a coated abrasive disc to grind steel, typically removing on the order of 500% or more steel than abrasive discs made with similar untreated and uncoated silicon carbide abrasive particles.

Granular abrasive material according to the present invention is produced by first heating particles of silicon carbide under fluidizing conditions to a temperature conducive to the formation of a hard refractory coating thereon from gaseous reactants. The reactant gases are then added to the fluidizing gas. The gaseous atmosphere contains the fluidizing gas and reactants at partial pressures and flow rates advantageous for the formation of integral, durable, adherent surface coatings of hard refractory materials preferably substantially completely encasing each of the particles. The coating process is maintained for a time sufficient to provide an integral, durable, adherent, hard refractory coating preferably without melting the coating materials. Useful abrasive granules are generally obtained when the coating has achieved a thickness of about 0.02% to about 10% of the average particle diameter.

The preferred reactants are selected from the group consisting of:

(a) silicon halide and ammonia;
(b) titanium halide and ammonia (or nitrogen);
(c) aluminum halide and ammonia;
(d) silicon halide, a volatile hydrocarbon and hydrogen;
(e) titanium halide, a volatile hydrocarbon and hydrogen;
(f) aluminum halide and an oxidizing gas composition;
(g) silicon halide, aluminum halide and ammonia;
(h) silicon halide, aluminum halide, ammonia and an oxidizing gas composition;
(i) silicon halide, ammonia and a volatile hydrocarbon;
(j) silicon halide, volatile silicon organic compound and ammonia; and
(k) silicon halide, titanium halide and ammonia.

The reaction mechanism and equilibrium may be influenced by the addition of hydrogen and/or hydrogen chloride to the gaseous reaction mixture which may produce an improved abrasive material. Surprisingly, simultaneous addition of hydrogen and chlorine to the gaseous reaction mixture has produced a more significantly improved product.

The preferred method involves chemical vapor deposition in a fluidized bed.

In a preferred method, the reactants comprise silicon tetrachloride and ammonia, the reaction temperature is in the range of about 1000° C. to 1600° C. (most preferably 1350° C. to 1450° C.), and the preferred mole ratio of silicon tetrachloride to ammonia is on the order of 1:1 to 1:20. While coatings prepared for the optimum time periods practiced in this invention using greater ratios of silicon tetrachloride to ammonia provide abrasive grain which may not achieve the performance level of abrasive grain prepared in the preferred mole ratio range, improved performance of such abrasive grain is also noted over that of uncoated, untreated silicon carbide.

The coating may also be accomplished at a temperature which is lower than the most preferred temperature range, for example, on the order of 1000° C. to 1200° C. in the case of silicon nitride. Such a coated abrasive grain typically has only moderate improvement in abrasiveness over untreated, uncoated silicon carbide, but post coating heat treatment at temperatures on the order of 1400° C., preferably in ammonia, will improve the coating to provide an abrasive material which is quite acceptable.

DESCRIPTION OF DRAWINGS

The invention may be further understood by reference to the accompanying drawings wherein.

BEST MODE FOR CARRYING OUT THE INVENTION

Figure 1:
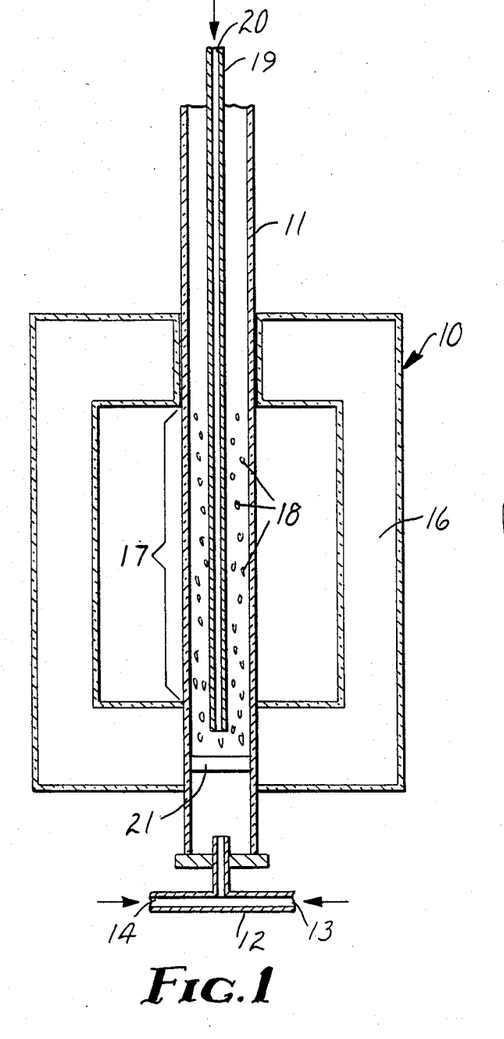
FIG. 1 is a schematic view of a fluidized bed apparatus useful for making the granular abrasive product of the present invention.

Referring to FIG. 1 of the drawing, there is shown a schematic view of a chemical vapor deposition apparatus 10 useful for producing the coated silicon carbide abrasive material of the present invention. Apparatus for coating of particulates by chemical vapor deposition in a fluidized bed is well known in the art. In this case, the apparatus typically includes an erect elongate reaction tube 11 (formed of a suitable material such as mullite) capable of use at the required temperature having at the lower end a multiport inlet tube such as T-tube 12, for example, having two inlet ports 13 and 14 respectively for introduction of a fluidizing gas and gaseous reactants to reaction zone within reaction tube 11 which lies within heating device such as electric heater 16 (detail not shown) to provide a heated zone 17 surrounding most of the reaction zone. Other gases may be introduced with separate tubes, e.g., tube 19 having inlet 20 to bring additional gaseous components into the gas stream for flow into tube 11. Particulate silicon carbide 18 is introduced into tube 11 through a suitable opening such as through its upper end which may be open (or capable of being opened) to permit the entry of such particulate material and is prevented from falling through the lower end of tube 11 by porous disc 21 through which a flow of fluidizing gas is maintained. The reactants are then introduced at the required partial pressures to give coatings having the desired compositions and the desired properties.

Figure 2:
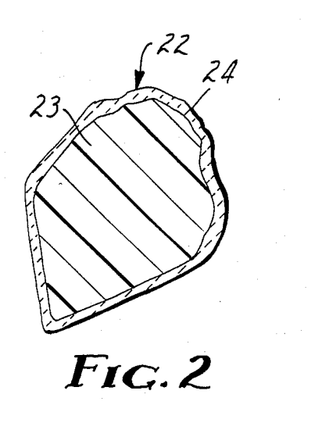
FIG. 2 is a greatly enlarged cross sectional view of an abrasive grain according to the present invention.
Figure 3:
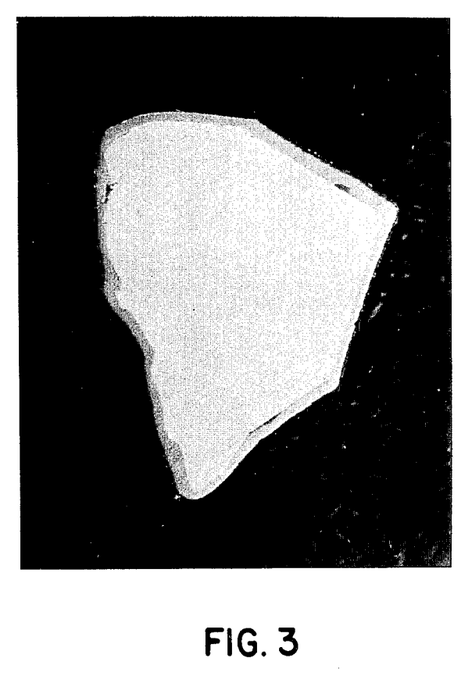
FIG. 3 is a photomicrograph (100 X) of a polished cross-section of a silicon carbide abrasive grain which has a coating thereon of silicon nitride.

As depicted in FIG. 2 a coated particle 22 comprises a particle 23 of silicon carbide covered with a coating 24 of refractory material.

The silicon carbide particulate material useful for preparation of the abrasive material of the present invention may be conventional, commercially available granular silicon carbide abrasive material or other suitable material. As in the case of other abrasive products, the particular particle size of the abrasive granule is dependent upon the end use requirements. The particle size may be within a wide range of particle sizes to produce abrasive coated particles within an equally wide range of sizes. For example, silicon carbide abrasive granules having a particle size in the range of about 50 micrometers to about 2000 micrometers may be useful. For particular applications, of course, the particle size may be larger or smaller.

Prior to coating, the silicon carbide granules are preferably treated to remove surface contaminants so that the coating adheres tenaciously to the granule surface. Cleaning may effectively be accomplished by elutriation with a liquid such as water or an acid solution. The violent motion and relatively high temperatures in a fluidized bed reactor prior to actual deposition of the coating are also generally sufficient to render the granular material suitable for the coating operation.

The deposited layer adheres tenaciously at least to portions of the particle, generally following the contours of the particle and, preferably, eventually envelops the particle to substantially completely coat it.

Useful particles coated with silicon nitride have been found to have a coating thickness on the order of 0.02 to 10% of the average particle diameter, as determined by nitrogen analysis and calculation (assuming a spherical particle) based upon the coating being silicon nitride. The preferred coating thickness for a particle having an average particle size in the range of about 500 to 1000 micrometers is about 0.5 to 25 micrometers.

The gaseous reactants introduced into the chemical vapor deposition apparatus to produce the coating are volatile materials which on mixing at the appropriate temperature will produce the desired refractory material. The reaction conditions for chemical vapor deposition are well known in the art.

Silicon nitride coatings on particulate material may be provided by reacting a silicon halide (e.g., silicon tetrachloride) with ammonia or with an ammonia-hydrogen mixture at elevated temperatures. The preferred reactants, from an economic standpoint are silicon tetrachloride and ammonia. The stoichiometric reaction may be represented as follows:

$$3SiCl_4 + 4NH_3 \rightarrow Si_3N_4 + 12HCl.$$

Employing the apparatus depicted in FIG. 1, once the fluidized particles are heated in a stream of fluidizing gas, silicon tetrachloride is introduced in the fluidizing gas stream which is then passed through the dispersion plate. Simultaneously, ammonia is fed into the reactor a short distance, e.g. about 5 to 10 centimeters, above the dispersion plate. To decrease the premature dissociation of ammonia, its flow velocity may be increased by the addition of a nitrogen stream.

Although the chemical deposition reactions may occur over a relatively wide range of reaction temperatures, as is known in the art, the preferred temperature of a fluid bed is maintained at about 1000° to about 1450° C. or higher; preferably between 1350° C. and 1450° C., in order to form an adherent, effective coating on the particles, with silicon nitride as the desired coating. At such temperatures, appropriate partial pressures and flow rates of reactants, there is provided a deposition rate of silicon nitride on the particulate material which leads to an essentially adherent coating which will exhibit the desired grinding performance. Although the stoichiometric reaction requires a ratio of ammonia to silicon tetrachloride of 4:3, the preferred ratio is 3:1 or higher. Ratios as high as 12:1 and higher have been found to provide integral durable adherent coatings on the silicon carbide particulate substrate which led to the formation of excellent abrasive material.

TESTING

Testing was carried out to determine the grinding ability of the various abrasive grain examples prepared according to the present invention, as compared to a control example, identified as Control "A", consisting of untreated, uncoated silicon carbide.

A second control sample, identified as Control "B", was prepared according to Koopman (U.S. Pat. No. 3,269,815), as follows:

| Parts (g) | Ingredients |
| --- | --- |
| 1200 g | 24 grade SiC |
| 24 g | "Aqua Flake" 31 solution |
| 15 g | "Pemco" P626 frit |
| 15 g | $Si_3N_4$ powder (<50 micron Norton "N.C. 132") |

The SiC mineral was initially coated with the "Aqua Flake" solution. The frit was then applied to the surface of the mineral and the $Si_3N_4$ powder was applied as the last coat. The mineral was then dried at 120° C. and fired at 850° C. in a rotary furnace.

Preparation of Abrasive Discs

The abrasive grain was formulated into abrasive grinding discs which were prepared in a conventional manner, as follows:

Backing: 30 mil (0.8 mm) vulcanized fiber—240 grains/4×6 in$^2$ (10.05 g/dm$^2$).

Make Adhesive: The adhesive was a conventional adhesive mixture for use in making coated abrasives containing 48 wt. percent phenol-formaldehyde resin solids and 52% calcium carbonate filler. Coating mixtures of this adhesive contained about 76 wt. percent solids in a water-ethyl "Cellosolve"[1] solvent blend.

[1] Ethyl "Cellosolve" is the trade designation for 2-ethoxy-1-ethanol.

Make Adhesive Coating Procedure: Wet coating weights were about 40 grains/4×6 inches (1.67 g/dm$^2$). After the mineral was applied, the make coat was precured by heating three hours at 190° F. (87.7° C.) to remove solvent and crosslink the resin.

Mineral: The mineral was grade 24 (having a particle size range of about 500 to 1000 μm). The mineral weight was about 195 grains/4×6 inches (8.16 g/dm$^2$). The mineral was electrostatically deposited on wet make adhesive coated surface of the backing.

Size Adhesive: The size adhesive was a conventional mixture of phenol-formaldehyde resin solids and calcium carbonate filler, having a filler level of 52 wt. percent of the solids, with the balance of 100 wt. percent being resin. The coating mixture was 76 wt. percent solids, in a water-ethyl "Cellosolve"[1] solvent blend.

Size Adhesive Coating Procedure: Wet coating weights were 120–150 grains/4×6 inches (5.02–6.28 g/dm$^2$).

The constructed disc was precured for two hours at 190° F. (87.7° C.) and final cured for 24 hours at 212° F. (100° C.).

Disc Preparation: The final product was converted into 7 inch (17.8 cm) OD or 9.125 inch (23.2 cm) diameter grinding discs and humidified for 24 hours at 50%–70% relative humidity with a weight on top in order to obtain flat discs.

Figure 4:
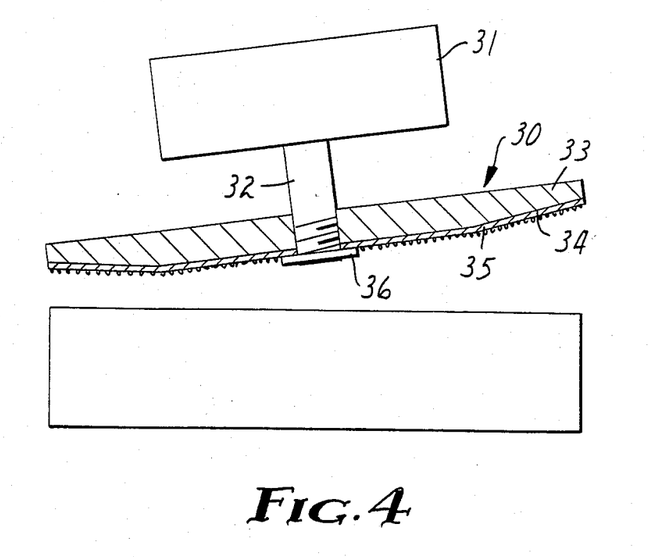
FIG. 4 is a drawing of an apparatus for testing the abrasiveness of abrasive discs made employing the granular abrasive material of the present invention.

The testing apparatus is depicted in FIG. 4 of the drawing. The apparatus 30 includes air motor 31 which drives a shaft 32 at 5000 rpm with a 7 inch (17.8 cm) diameter aluminum back-up plate 33 having a beveled face 34 to which test coated abrasive disc 35 is attached and held in place by retainer 36. Back-up plate 33 has a 1 inch (2.5 cm) wide peripheral bevel at an angle of 6 degrees with respect to its back surface.

The device was positioned with the air motor shaft at an angle above a 1 inch wide (2.5 cm) by 8 inch long (20.3 cm) 1018 low carbon steel workpiece bar so that the portion of the abrasive disc on the beveled portion of the back-up plate pad was approximately parallel to the surface of the workpiece to prevent retainer 36 from contacting the surface of the workpiece during grinding. A 15 pound (6.8 kg) load was applied to the grinder while the workpiece was caused to reciprocate 7 inches (17.8 cm) back and forth in a direction perpendicular to the applied load. Under such conditions, the abrasive grinding area was 1 square inch (6.5 square cm), resulting in a load of 15 lbs./in$^2$ (1.1 kg/cm$^2$).

The test was run by grinding a preweighed workpiece for 1 minute, then reweighing the workpiece to obtain the weight of metal removed. This procedure was repeated 10 times, using a set of 10 fresh, substantially room temperature workpiece bars and a total was obtained by adding the weight of the steel removed from each of the 10 workpieces. When a test was completed for 10 sequences, the total weight removed for 10 minutes was recorded. If the rate of cut in a given 1 minute sequence was found to be less than 3 grams of metal removed, the test was terminated and the total cut computed by adding the number of grams of metal removed to that point and indicating the amount of time.

EXAMPLES

In the following examples, the total flow rates (about 22 liters per minute) are given for room temperature and atmospheric pressure conditions of the input gases. The partial pressure in atmospheres is listed in parentheses after the name or formula of each compound, disregarding the chemical reactions taking place in the fluidized bed.

EXAMPLES 1-14

A mullite tube fluidized bed reactor of the type depicted in FIG. 1 was slowly heated to 1000° C. and then gradually charged at its top open end with 1260 g silicon carbide (grade 24) abrasive particles (average diameter about 770 μm) while a nitrogen flow from the tube bottom was maintained at a sufficient rate to fluidize the particles. The temperature of the reactor was then increased at a rate of 100° C./hour to about 1400° C. Silicon tetrachloride (0.009) was then fed into the reactor as a gas by volatilizing (by boiling) liquid silicon tetrachloride into a measured nitrogen stream and passing the resultant stream through a reflux condenser cooled to a temperature sufficient to condense excess silicon tetrachloride gas to maintain the desired partial pressure of this reactant.

minutes of coating, part of the fluidizing nitrogen was replaced with hydrogen (0.091) added to the ammonia stream and with chlorine (0.076) introduced through a separate alumina tube. These conditions were maintained for 170 minutes. Grinding results: 625 g for 10 minutes.

TABLE I

| Example No. | Coating Time Minutes | Coating Temp. °C. | $SiCl_4$ Partial Pressure (atm × $10^3$) | Ratio $NH_3$:$SiCl_4$ | Nitrogen (wt. %)[1] | Grinding Result Amt. (g) | Time (min) |
|---|---|---|---|---|---|---|---|
| Control A | None | NA[4] | NA | NA | NA | 7 | 2 |
| Control B | NA | NA | NA | NA | NA | 6 | 1 |
| 1 | 222 | 1200 | 10.4 | 7.8 | 2.2 | 117 | 5 |
| 2 | 5 | 1400 | 9.0 | 9.0 | 0.4 | 99 | 6 |
| 3 | 15 | 1400 | 9.0 | 9.0 | 0.4 | 103 | 6 |
| 4 | 30 | 1400 | 10.3 | 7.9 | 0.5 | 222 | 10 |
| 5 | 244 | 1300 | 20.5 | 4.6 | — | 278 | 10 |
| 6 | 952 | 1400 | 9.8 | 8.4 | — | 364 | 10 |
| 7 | 469 | 1400 | 29.2 | 3.3 | — | 391 | 10 |
| 8 | 249 | 1320 | 9.5 | 8.5 | — | 395 | 10 |
| 9[2] | 243 | 1200 | 9.6 | 8.5 | 2.7 | 363 | 10 |
| 10[3] | 250 | 1320 | 9.5 | 8.5 | — | 507 | 10 |
| 11 | 480 | 1400 | 8.9 | 8.5 | 3.4 | 563 | 10 |
| 12 | 227 | 1400 | 8.9 | 7.9 | — | 579 | 10 |
| 13[3] | 255 | 1400 | 9.1 | 8.9 | 2.3 | 606 | 10 |
| 14 | 239 | 1450 | 9.6 | 8.4 | — | 608 | 10 |

[1]Percent nitrogen determination on a TC 36 Nitrogen-Oxygen Determinator. Leco Corp., St. Joseph, Michigan; a dash indicates not determined.
[2]Preheated for 300 minutes at 1400° C. with ammonia-nitrogen.
[3]Hydrogen was added to the $SiCl_4$—$N_2$ stream.
[4]"NA" means not applicable.

Simultaneously, gaseous ammonia (0.072) was introduced through a center feed tube with a nitrogen stream added to increase the flow velocity of the ammonia and thus decrease the proportion of ammonia which decomposes prior to reaching the reaction zone. Coating was continued for 480 minutes. The fluid bed and its contents were then cooled from 1400° C. to 1000° C. over a period of four hours while maintaining the nitrogen fluidization. The coated grain was removed by vacuum through a 9 mm stainless steel tube. A dull grayish abrasive grain consisting of silicon carbide particles coated uniformly with a 10 μm silicon nitride layer was obtained. X-ray diffraction (XRD) examination revealed that the coating contained $Si_3N_4$. This abrasive grain is identified in Table I as Example No. 11.

Other silicon nitride-coated abrasive grain, identified in Table I as Example Nos. 1-10 and 12-14, were produced in a similar manner employing the conditions set forth in Table I.

In Examples 10 and 13 a stream of hydrogen (0.10) was added to the silicon tetrachloride-nitrogen stream.

In Example 9, prior to chemical vapor deposition, the batch was heated at 1400° C. in $NH_3$ (0.027)—nitrogen for five hours and then cooled to 1200° C. for chemical vapor deposition.

Abrasive grinding discs prepared of the abrasive grain of Examples 1-14 and controls A and B were evaluated by the grinding test described above. Results are shown in Table I.

EXAMPLE 15

Abrasive granules were prepared according to the procedure described in Example 11, except $SiHCl_3$ (0.009) was substituted for the $SiCl_4$ and the coating time was 261 minutes. Grinding results: 510 g for 10 minutes.

EXAMPLE 16

Abrasive granules were prepared according to the procedure described in Example 11, except that after 15

EXAMPLE 17

Abrasive grain was prepared as described in Example 11, except (a) $TiCl_4$ (0.011) was substituted for the $SiCl_4$, (b) the $NH_3$ (0.142) flux was increased, (c) the temperature was 1150° C. and (d) the coating time was 390 min. X-ray diffraction showed that the coating was titanium nitride.

EXAMPLE 18

Abrasive grain was produced employing the procedure described in Example 11 modified in the following manner:

(a) A quartz ampoule containing aluminum pellets was incorporated beneath the gas distributor disc and $AlCl_3$ vapor was generated by passing a chlorine (0.014)—nitrogen mixture through the ampoule, and the generated $AlCl_3$ (g) mixed with the fluidizing nitrogen stream in place of the $SiCl_4$ stream;

(b) The temperature of the bed was maintained at 1155° C.;

(c) Ammonia (0.093) and nitrogen (0.056) were passed through the center feed tube; and (d) Coating was performed over a period of 248 minutes.

Elemental analysis showed the presence of aluminum (qualitative) and nitrogen (0.86%).

EXAMPLE 19

Using the apparatus described in Example 11, abrasive grain was prepared. $TiCl_4$ (0.008) was added to fluidizing argon gas. Methane (0.009) and hydrogen (0.025) were introduced into the center feed tube. The temperature was 1150° C. and the coating time was 420 minutes.

EXAMPLE 20

Abrasive grain was prepared following the procedure described in Example 11, except that argon was substituted for the nitrogen, and CH$_4$ (0.008) and hydrogen (0.24) for the ammonia-nitrogen mixture. X-ray diffraction revealed that the coating was β-silicon carbide.

EXAMPLE 21

Silicon nitride coating was deposited during 268 minutes by the procedure described in Example 11 and the resultant coated abrasive grain was then over-coated with alumina. After the silicon nitride coating, the batch was cooled to 1000° C. and an Al$_2$O$_3$ coat was deposited over 60 minutes. AlCl$_3$ gas (0.017) was generated as described in Example 18. A stream of hydrogen (0.28) was added to the nitrogen-AlCl$_3$ stream. The center feed tube, previously used for the addition of NH$_3$, was used to add a mixture of CO$_2$ (0.02) and CO (0.08).

EXAMPLE 22

A charge of silicon carbide was introduced into the fluid bed reactor as described in Example 11, heated therein to 1400° C. in nitrogen, maintained fluidized with nitrogen at that temperature for 180 minutes and then cooled at 1000° C. in 240 minutes. Coating of alumina was then performed for 308 minutes. AlCl$_3$ vapor (0.012) was generated as described in Example 20. Hydrogen (0.194) and CO$_2$ (0.194) were added through the center feed tube. Chemical analysis revealed 0.11 wt. percent nitrogen and 2.4 wt. percent oxygen.

EXAMPLE 23

Abrasive granules were produced by repeating the alumina-coating steps described in Example 22, except the 1400° C. heat-treatment was omitted and the coating was performed for 244 minutes at 1000° C. to produce a control abrasive material similar to that disclosed in Johnson U.S. Pat. No. 4,249,913. Chemical analysis revealed 0.01 wt. percent nitrogen and 2.8 weight percent oxygen.

EXAMPLE 24

Abrasive granules were produced according to Example 11, except AlCl$_3$ gas (0.0025), generated as in Example 21, was added to the SiCl$_4$ gas (0.0086) and the coating was deposited for 256 minutes.

EXAMPLE 25

Abrasive granules were produced according to Example 11, except that an AlCl$_3$ gas (0.008) stream (generated by reacting aluminum with HCl) was added to the SiCl$_4$ (0.004) gas stream and a H$_2$O (0.006)—saturated nitrogen stream was added to the NH$_3$ (0.070)—nitrogen stream. Coating was accomplished in 480 minutes. Chemical analysis revealed the composition 3Si$_3$N$_4$·2Al$_2$O$_3$·2AlN.

EXAMPLE 26

Abrasive granules having a Si$_3$N$_4$ coat deposited during 85 minutes according to the procedure described in Example 11 were, during the next 435 minutes, subjected to AlCl$_3$ gas (0.004) added to the SiCl$_4$ gas (0.004) stream while, through the center feed tube, CO$_2$ (0.013) was added to the NH$_3$ (0.066)—nitrogen stream.

EXAMPLE 27

Conditions similar to those of Example 11 were used to produce abrasive granules, except that CH$_4$ (0.011) was added to the NH$_3$—nitrogen stream and the coating time was 510 minutes.

EXAMPLE 28

The procedure of Example 11 was repeated to produce abrasive granules, except TiCl$_4$ (0.001)—nitrogen stream was added to the SiCl$_4$ (0.0074)—nitrogen stream, the coating temperature was 1350° C., and the coating time was 542 minutes.

EXAMPLE 29

Abrasive granules were produced using the procedure described in Example 11, except 25 cc MeSiCl$_3$ (1) was added to the first 100 cc of SiCl$_4$ (1) which was used to generate the silicon-containing gas stream and the coating time was 492 minutes.

EXAMPLE 30

Abrasive granules were produced by starting the coating at 1400° C. with mixed SiCl$_4$ —TiCl$_4$ varying the Si:Ti ratio from 12:1 at the interface to 0.4:1 at 194 minutes into the run, at which time only TiCl$_4$ was added, thus producing a bicomponent layer. A TiN layer was then deposited for 273 minutes over the bicomponent layer. The temperature was gradually decreased to 1150° C. during the first 194 minutes and was maintained at that temperature for the remainder of the run.

The foregoing abrasive grain Examples 17–30 were formulated into abrasive discs and tested for abrasiveness as described above. Results are shown in Table II.

TABLE II

| Example No. | Composition | Type | Grinding Result Amount (g) | Time (Min) |
|---|---|---|---|---|
| 17 | Titanium Nitride | Single Component | 73 | |
| 18 | Aluminum Nitride | ″ | 141 | |
| 19 | Titanium Carbide | ″ | 73 | |
| 20 | β-Silicon Carbide | ″ | 21 | |
| 21 | Alumina/Silicon Nitride | Multiple Layer | 698 | 3 |
| 22 | Alumina/Nitrided Substrate | ″ | 249 | |
| 23[1] | Alumina | Single Component | 13 | |
| 24 | Aluminum-Silicon-Nitride | Multicomponent | 709 | 3 |
| 25 | Sialon | Multicomponent | 134 | |
| 26 | Sialon/Silicon Nitride | Multiple Layer, Multicomponent | 220 | 3 |
| 27 | Silicon-nitrogen-carbon composition | Multicomponent | 602 | 3 |
| 28 | Titanium-Silicon-Nitride | Multicomponent | 579 | 3 |
| 29 | Silicon Nitride/Silicon-nitrogen Carbon Composition | Multiple Layer, Multicomponent | 662 | 3 |
| 30 | Titanium nitride/titanium- | Multiple Layer, Graded Multicomponent | 141 | 3 |

TABLE II-continued

| Example No. | Composition | Type | Grinding Result Amount (g) | Time (Min) |
|---|---|---|---|---|
| | silicon nitride | | | |

[1]Control example

EXAMPLE 31

The following experiment was carried out to establish the utility as improved abrasive grain of silicon carbide particles partially coated with refractory material. Grade 24 (average particle size 770 μm) refractory coated silicon carbide abrasive grain prepared according to Example 11 was crushed using a Plattner diamond mortar and pestle, taking care not to crush the particles to a fine powder. The resultant crushed material was screened and the fraction having a particle size range of 297 to 419 μm was selected. Optical microscopic examination of the particles of this fraction revealed partially coated particles having fractures with uncoated silicon carbide. The partially coated abrasive grain was used to prepare experimental abrasive grinding discs by conventional methods and the experimental grinding discs were evaluated against discs made under identical conditions using the same grade uncoated silicon carbide, fused alumina abrasive grain and silicon carbide particles which had been fully coated with refractory material according to Example 11. Grinding results were as shown in Table III.

TABLE III

| Abrasive (297 to 419 μm) | Grinding Result Amount (g) | Time (min) |
|---|---|---|
| Example 31 (partially coated) | 283 | 10 |
| Example 11 (fully coated) | 400 | 10 |
| Alumina | 84 | 4 |
| Silicon Carbide (uncoated) | 9 | 2 |

We claim:

1. Granular abrasive material comprising silicon carbide, each particle thereof characterized by being coated over at least a part of its surface with an integral, durable, adherent coating consisting essentially of hard refractory material comprising metal nitride or carbide.

2. The granular abrasive material of claim 1 wherein said coating completely covers each of said particles.

3. The granular abrasive material of claim 1 wherein said metal is selected from the group consisting of
 a. silicon;
 b. titanium;
 c. aluminum;
 d. boron; and
 e. mixtures thereof.

4. The granular abrasive material of claim 1 wherein said coating consists essentially of silicon nitride.

5. The granular abrasive material of claim 1 wherein said coating comprises a multicomponent composition.

6. The granular abrasive material of claim 5 wherein said multicomponent composition comprises sialon.

7. The granular abrasive material of claim 1 wherein said coating comprises at least in part two or more layers or refractory material.

8. The granular abrasive material of claim 7 wherein one of the layers of hard refractory material comprises alumina.

9. The granular abrasive material of claim 5 wherein said coating of hard refractory material comprises a graded multicomponent composition.

10. The granular abrasive material of claim 1 wherein said coating has a thickness of about 0.02 to 10% of the average particle diameter.

11. An abrasive article containing granular abrasive material wherein said granular abrasive material comprises granular abrasive material comprising silicon carbide, each particle thereof characterized by being at least partially coated with an integral, durable, adherent coating consisting essentially of hard refractory material comprising metal nitride or carbide.

12. The abrasive article of claim 11 wherein said granular abrasive material comprises a blend of the granular abrasive material defined in claim 11 and other granular abrasive material.

13. The abrasive article of claim 11 in the form of a coated abrasive article comprising a backing member having bonded to at least one surface thereof granular abrasive material comprising the granular abrasive material defined in claim 11.

14. The abrasive article of claim 11 in the form of a nonwoven abrasive article comprising a three-dimensional open web having granular abrasive material adhered throughout, wherein said granular abrasive material comprises the granular abrasive material defined in claim 11.

15. The abrasive article of claim 11 in the form of an abrasive grinding wheel comprising an annulus of consolidated granular abrasive material comprising the granular abrasive material defined in claim 11.

16. Method for producing granular abrasive material comprising:
 a. heating particles of silicon carbide to a temperature conducive to the formation of a hard refractory coating thereon from gaseous reactants; and
 b. contacting the heated particles with a gaseous atmosphere containing a diluting gas and said reactants in an amount, at a temperature and for a time sufficient to provide a hard refractory coating of about 0.02 to 10% of the average particle diameter on at least a portion of the surface of each of said particles of a coating material selected from the group consisting essentially of hard refractory material comprising metal nitride or carbide.

17. The method of claim 16 wherein said particles are coated in a fluidized bed.

18. The method of claim 16 wherein said temperature is in the range of about 1000° C. to 1600° C.

19. The method of claim 16 wherein said gaseous atmosphere comprises a mixture of $SiCl_4$ and $NH_3$.

20. The method of claim 19 wherein the mole ratio of $SiCl_4$ to $NH_3$ is from 1:1 to 1:20.

21. The method of claim 16 wherein multiple layers of refractory material are coated on each particle.

22. The method of claim 21 wherein adjacent layers of refractory material are of different refractory materials.

23. The method of claim 21 wherein adjacent layers of refractory material have the same composition.

24. The method of claim 23 wherein adjacent layers of refractory material are formed under different conditions.

25. The method of claim 16 including the initial step of heating said particles in an atmosphere of $N_2$ or a mixture of $N_2$ and $NH_3$.

26. The method of claim 16 including the final step of heating said particles in an atmosphere of $NH_3$ or a mixture of $N_2$ and $NH_3$.

27. The method of claim 16 wherein the gaseous atmosphere also comprises hydrogen and chlorine.

* * * * *